United States Patent
Dvinov et al.

(10) Patent No.: US 8,782,605 B2
(45) Date of Patent: Jul. 15, 2014

(54) METHODS AND SYSTEMS FOR PRESENTING DIFFERENT VERSIONS OF AN APPLICATION

(75) Inventors: Danil Dvinov, San Francisco, CA (US); Andrew Smith, San Francisco, CA (US)

(73) Assignee: Salesforce.com, Inc., San Francisco, CA (US)

( * ) Notice: Subject to any disclaimer, the term of this patent is extended or adjusted under 35 U.S.C. 154(b) by 774 days.

(21) Appl. No.: 12/971,320

(22) Filed: Dec. 17, 2010

(65) Prior Publication Data

US 2011/0296380 A1 Dec. 1, 2011

Related U.S. Application Data

(60) Provisional application No. 61/349,503, filed on May 28, 2010.

(51) Int. Cl.
*G06F 9/44* (2006.01)

(52) U.S. Cl.
USPC .......................................................... 717/123

(58) Field of Classification Search
USPC ................. 717/109–113, 140, 125–126, 136, 717/105–106, 120–123; 707/100, 723; 715/733, 202, 762; 703/22; 358/1.13
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,838,973 A * | 11/1998 | Carpenter-Smith et al. | .. 717/105 |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,279,008 B1 * | 8/2001 | Tung Ng et al. | ...................... 1/1 |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |

(Continued)

*Primary Examiner* — Tuan A Vu
(74) *Attorney, Agent, or Firm* — Blakely, Sokoloff, Taylor & Zafman LLP (57) ABSTRACT

Methods and systems for presenting different versions of an application are described. In one example, a selection of a version of application code is received. Such a selection may include a simultaneous selection of all versions. Information about the selected version is retrieved. A description of features contained within the selected version is presented and then a version summary for each listed feature is displayed, together with the description of features, to indicate the versions of the application code that contain the respective feature.

20 Claims, 8 Drawing Sheets

(56) References Cited

U.S. PATENT DOCUMENTS

| | | |
|---|---|---|
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,851,105 B1 * | 2/2005 | Coad et al. .................... 717/106 |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0056195 A1 * | 3/2003 | Hunt ............................. 717/116 |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065942 A1 * | 3/2005 | Diab ............................. 707/100 |
| 2005/0091098 A1 | 4/2005 | Brodersen et al. |
| 2006/0026559 A1 * | 2/2006 | Gunturi et al. ................ 717/110 |
| 2009/0180133 A1 * | 7/2009 | Yamamoto .................... 358/1.13 |

* cited by examiner

Apex Class
myGlobalClass

«Back to List: Apex Classes ←102

Apex Class Detail                                      Edit | Delete | Download | Security | Show Dependencies Name   myGlobalClass ←104                                Status   Active ←110

Namespace Prefix                                          Is Valid   ✓ ←112

Created By   Test User, 5/14/2010 3:24 PM ←108     Last Modified By   Test User, 5/14/2010 3:29 PM ←114

| Class Body | Class Summary | Version Settings |

```
 1  global class myGlobalClass implements myGlobalInterface {
 2      global String str;
 3
 4      global myGlobalClass(String str) {
 5          setStr(str);
 6      }
 7
 8      global void setStr(String str) { this.str = str; }
 9      global String getStr() { return str; }
10
11      global void interfaceMethod() { return; }
12  }
```

```
Class Body   Class Summary   Version Settings

┌─132                    ┌─134
 1   global class myGlobalClass implements myGlobalInterface {
 2       global String str;
 3       global static Integer count;
 4              ╲136    ╲138
 5       global myGlobalClass(String str) {
 6           this.Str = str;       ╲140
 7           count = 0;
 8       }
 9
10                ┌─144
11
12       @deprecated
13       global void setStr(String str) { this.str = str; }
14       global String getStr() { return str; }╲142    145
15                                                     ╱
16       global static void incrementCount() { count++; }╱
17       global static Integer getCount() { return count; }
18                                                         ╲
19       global void interfaceMethod() { return; }╲         146
20   }                                             148
```

| Class Body | Class Summary | Version Settings |

Version: 1.1 ▼ ~150 global Class myGlobalClass ~152
Available in Versions: 1.0 - Current
~154

Interfaces (1)

| Access | Name | Available in Versions |
|---|---|---|
| global | myGlobalInterface | 1.0 - Current |

Properties (2)

| Access | Name | Available in Versions |
|---|---|---|
| global | static Integer count | 1.1 - Current |
| global | String str ←170 | 1.0 - Current |

Constructors (1)

| Access | Signature | Available in Versions |
|---|---|---|
| global | myGlobalClass(String str) | 1.0 - Current |

Methods (4)

| Access | Signature | Available in Versions |
|---|---|---|
| global | String getStr() | 1.0 - Current |
| global | void interfaceMethod() | 1.0 - Current |
| global | static Integer getCount() | 1.1 - Current |
| global | static void incrementCount() | 1.1 - Current |

| Class Body | Class Summary | Version Settings |
|---|---|---|

Version: [ All Versions ▼ ] ~150 global Class myGlobalClass
Available in Versions: 1.0 - Current

Interfaces (1)

| Access | Name | Available in Versions ~168 |
|---|---|---|
| global | myGlobalInterface | 1.0 - Current |

Properties (2)

| Access | Name | Available in Versions |
|---|---|---|
| global | static Integer count ~172 | 1.1 - Current |
| global | String str ~170 | 1.0 - Current |

Constructors (1)

| Access | Signature | Available in Versions |
|---|---|---|
| global | myGlobalClass(String str) | 1.0 - Current |

Methods (5)

| Access | Signature | Available in Versions |
|---|---|---|
| global | String getStr() | 1.0 - Current |
| global | void interfaceMethod() | 1.0 - Current |
| global | void setStr(String str) | 1.0 (Deprecated) |
| global | static Integer getCount() | 1.1 - Current |
| global | static void incrementCount() | 1.1 - Current |

METHODS AND SYSTEMS FOR PRESENTING DIFFERENT VERSIONS OF AN APPLICATION

CLAIM OF PRIORITY

This application claims the benefit of U.S. Provisional Patent Application 61/349,503 entitled Methods and Systems for Presenting Different Version Prototypes of an Apex Class in a Multi-Tenant Environment, by Dvinov et al., filed May 28, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to the presentation of versions of software code to a user or developer in a database network system computing environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. Additional functions and faster use of databases has led to the development of specialized applications that are applied to the database. Through a well-designed application, information can be retrieved, modified, displayed and used more quickly and more easily than by performing manual operations. New functions can be developed using the database that otherwise would not be available.

Code development generally and for such database applications presents many challenges. When there is more than one version of the code, there are difficulties not only for developers but also for the users of the code. A typical code viewing tool will allow the developer to view and edit code. In some instances, there may be some sort of analysis that will provide some information about the features in the code such as variables, operations, commands, number of lines etc. Such a viewer is helpful, but does not readily allow the developer to consider different versions and readily compare them to each other.

As software development kits continue to provide easier and faster development of new applications, comparison and analysis tools can be further improved as well.

BRIEF SUMMARY

In an embodiment and by way of example, methods and systems are provided for presenting different versions of application code. An embodiment includes a list of features contained within a selected version of application code, a description of characteristics of each listed feature, and a version summary for each listed feature to indicate the versions of the application code that contain the respective feature.

In one example, a selection of a version of application code is received. Such a selection may include a simultaneous selection of all versions. Information about the selected version is retrieved. A description of features contained within the selected version is presented and then a version summary for each listed feature is displayed, together with the description of features, to indicate the versions of the application code that contain the respective feature.

While one or more implementations and techniques are described with reference to an embodiment in which methods and systems are provided for presenting different versions of application code are implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Methods and systems are provided for presenting different versions of application code. In the described examples, different version prototypes of a class written in an object oriented programming language, developed and used in a multi-tenant environment, are presented. However, the presentation system may be applied to other types of code in other applications.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

The present description is in the context of Apex Code a strongly-typed object-oriented programming language that executes on the Force.com™ platform (a platform maintained by Salesforce.com). However, the invention is not so limited and may be applied to a variety of other code, class, and application development environments. Apex is used to add additional functionality to applications, to write database triggers, and to program controllers in a user interface layer. It has a tight integration with the database and query language, good web services support, and includes features such as futures and governors for execution in a multi-tenant environment. Apex has syntax that that is similar to Java and C#. It has the usual array of features such as classes, interfaces, constants, class variables, and annotations.

The classes contain fields or attributes, and methods, each of which has an access level, such as global, private, package, etc. The classes contain the source code for a particular object and can be called by other classes.

For context in understanding the examples provided below, Apex supports a number of different data types, primitive data types such as Integer and Date, sObject types that represent persistent objects, collections and enumerations, and user and system-defined Apex classes. The primitive data types include, Blob—for storing binary data, Boolean, Date, Time and Datetime, Decimal—for representing arbitrary precession numbers, including currency, ID—a database record identifier type, and Integer, Long, Double and String.

A package in Apex is a bundle of components that make up an application or piece of functionality. Packages are typically created so that their components can be distributed to other companies or individuals. Packages come in two forms: unmanaged and managed. Unmanaged packages can be used for a one-time distribution, like a template. These may be used for sharing application templates or code samples. The installer receives an independent copy of the components. Managed packages hide the source code of many components, and provide a way for the package creator to offer upgrades to the package. A package typically consists of a number of different components. For example, it may contain user interface components, database components such as objects and triggers, Apex code, page layouts, reports and more. All of these components can be bundled together into what is called a package, for the purposes of distribution and installation. Packages can be versioned with version numbers to show older and newer versions.

Developers of managed packages may choose to expose the implementations of classes in their package. In effect, this exposes the Apex source code of the package that was written. One of the possible uses for exposing the source code is to allow users to create "extension packages," that is packages that are built on top of the original or base package. An extension package may contain Apex code that calls in to the base package. This allows users to add new functions to existing packages.

Presentation System

Figure 1A:
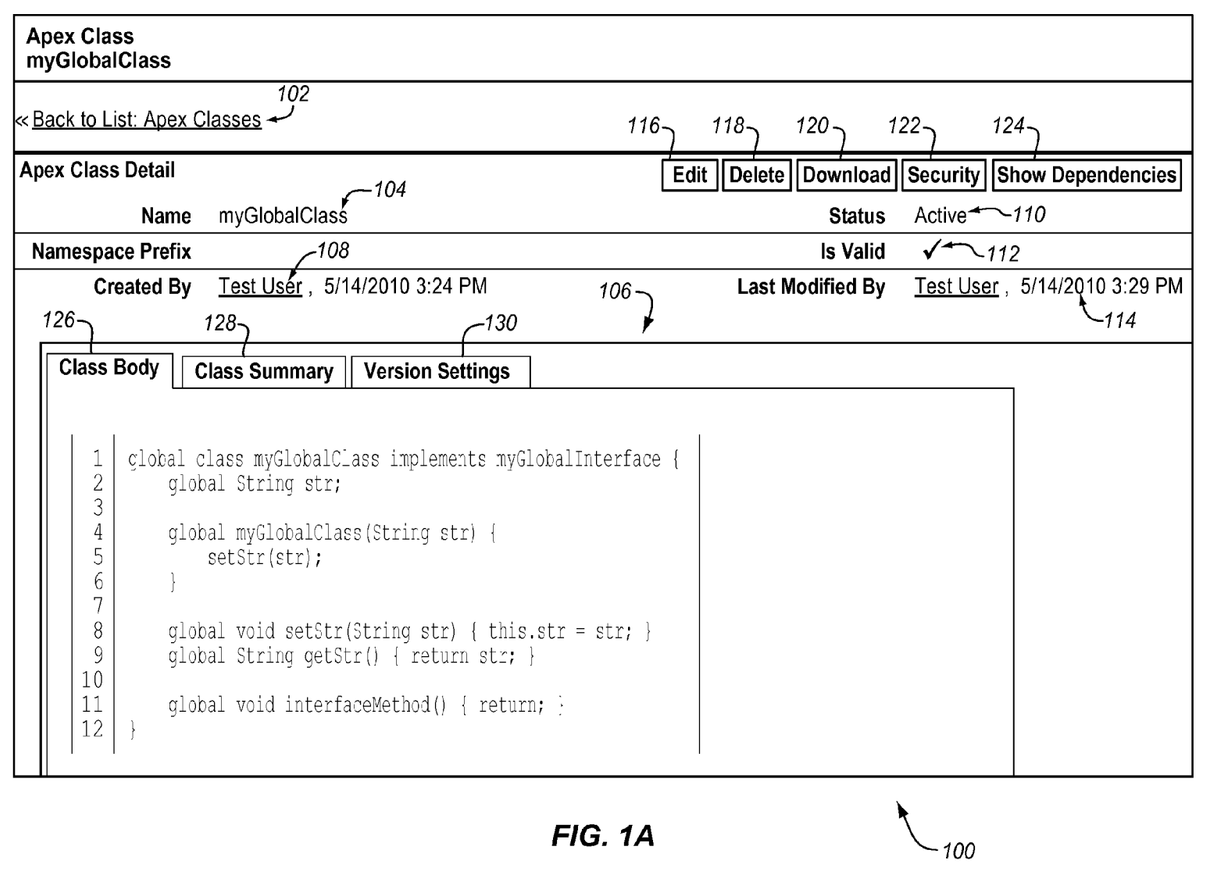
FIGS. 1A-1B illustrate a representative presentation of a prototype version 1.0 of a class showing the body of the class in an embodiment.

FIG. 1A is an example of a presentation window suitable for reviewing a class for Apex or any other similar programming language. The presentation display 100 shows a command 102 to return back to a list of Apex classes. In the list of Apex classes as shown in FIG. 1A, the user can select any desired class. In the illustrated example shown, the user has selected a class named myGlobalClass 104 and this is provided in an identification panel 106. The identification panel also provides general information about the selected class. For example a name of the writer of the class 108 is provided, a status of the class 110, a validity indicator 112, and relevant dates for creation and modification are provided 114 for the named class. These and more details can all be provided in the identification panel or class detail panel.

The identification panel also provides several additional options for the user. An edit button 116 allows the user to go to a code editing function in this or in another interface. A delete function 118 allows the user to completely delete the selected class. A download button 120 allows a user to download this or any other class. A security button 122 allows a user to change the security privileges or access privileges for the class, and a show dependencies button 124 allows the user to view dependencies for the class and see any other related classes. All of these functions from the edit button 116 to the show dependencies button 124 can be provided within the presentation display system 100 or in one or more other utilities.

The identification panel 106 also provides a set of views for the selected class. Each view provides different information about the class. A first view 126 is called "class body." This shows the actual source code for the class. The class body 126 provides a viewer for all of the source code of the class. The class body may provide an editing function or, as shown in FIG. 1A, an editing function 116 can be accessed through a separate button. A second view is a class summary 128 which is shown in more detail in FIGS. 2A and 2B. A third view is a versions setting view 130 which may provide a variety of different functions. One function is to allow a developer or an authorized user to choose the version of Salesforce.com API (Application Programming Interface) that is used by the class. If a class refers to an installed package, such as a base package, then a developer or user could choose a particular version of that base package to be used by the class.

Figure 1B:
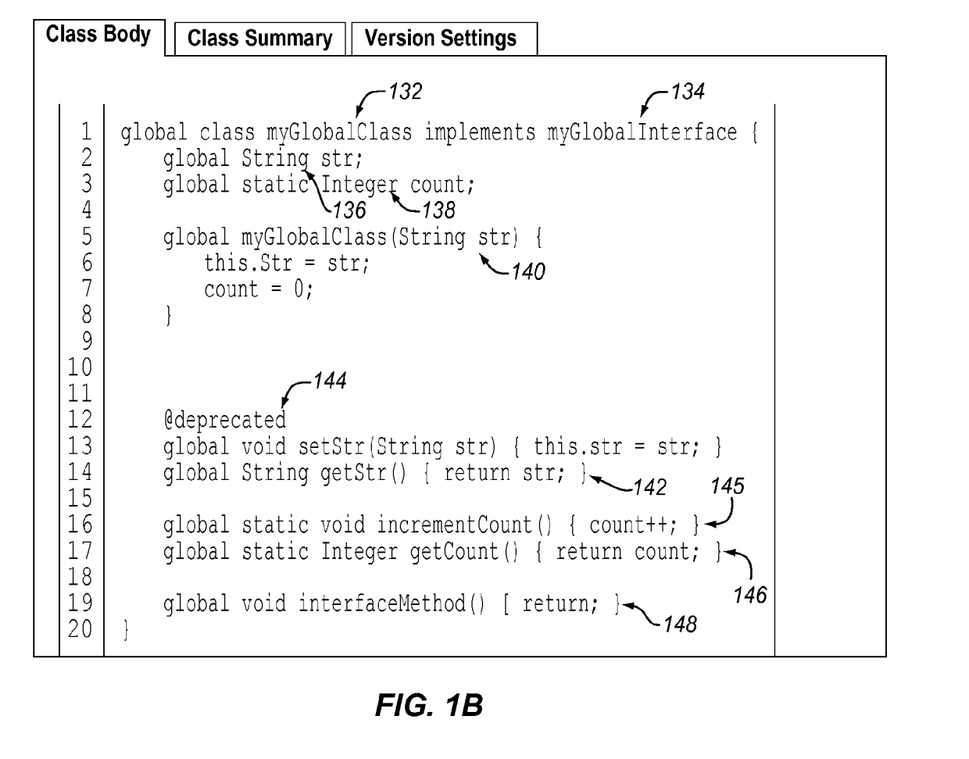
Figure 2A:
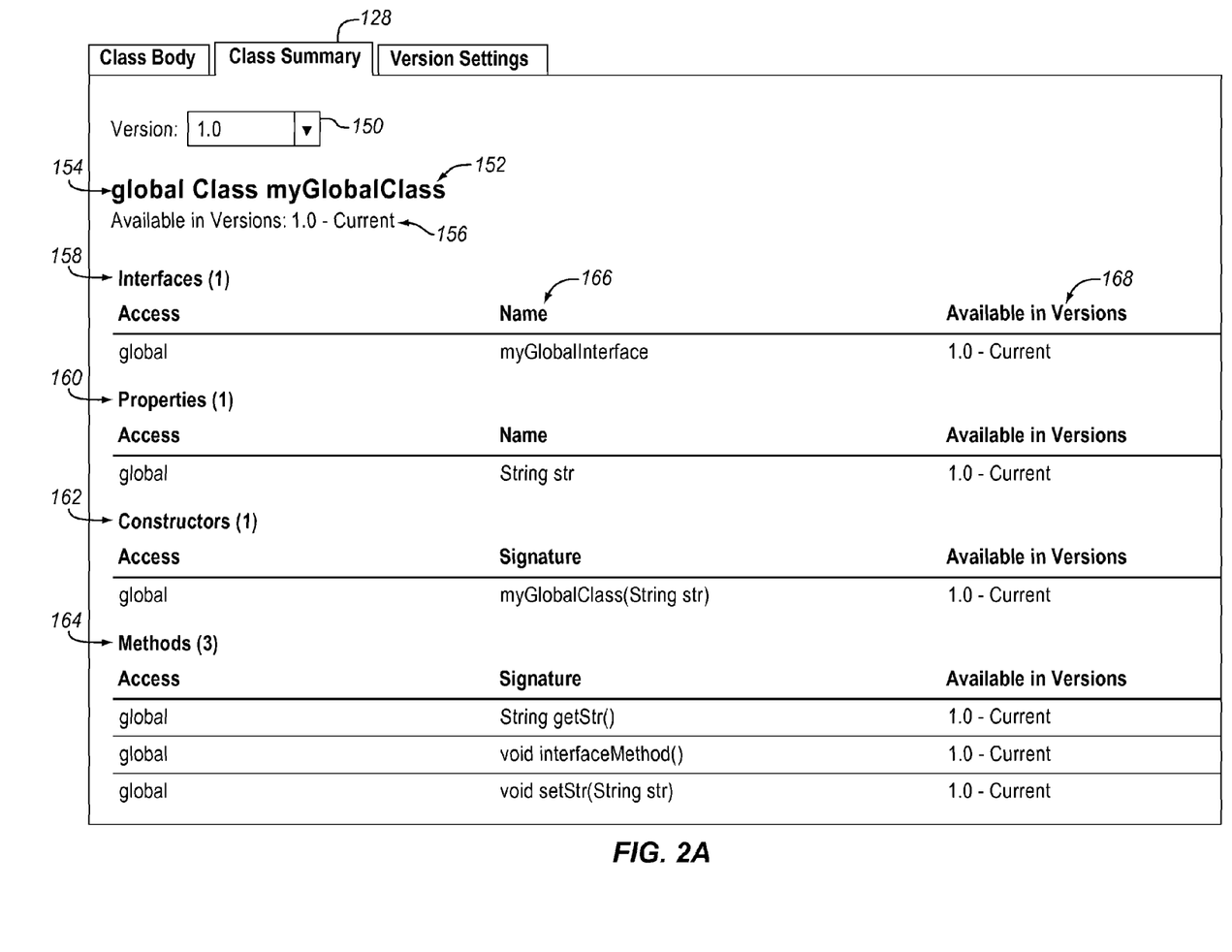
FIGS. 2A-2B illustrate a representative presentation of prototype versions 1.0 and 1.1, respectively, of a class showing class summaries in an embodiment.

FIG. 1B shows the details of the class body view enlarged. While FIG. 1A shows the class body for version 1.0 of myGlobalClass, FIG. 1B shows the class body for version 1.1 of the class. The version is indicated in a display for a pick list of the class summary as shown in FIG. 2A and may also be provided in the identification panel 106 (not shown). The class has a set of numbered code lines, numbered in this case from 1-20, and shows the source code for the class. In this particular example, the code is written for Apex however, the presentation display 100 can be used for a variety of different types of code and for other types of code that is not formed as classes.

In the particular example of FIG. 1B, a simplified code sequence is shown. The source represents an example view of code which is a short global Apex class with a variable, a constructor, and a few methods. The class also implements an interface named "myGlobalInterface" This class is presented as being included in a managed package and released as version 1.1. In FIG. 1A the identification panel indicates the version of "myGlobalClass" as being version 1.0. While the version of FIG. 1B is version 1.1. Several modifications have been performed to form the new version of the class, named "myGlobalClass" version 1.1. A new variable "COUNT" was added along with a new method "getCount( )". The method "set Str(String str)" is now annotated as deprecated. In the source code, the name of the class "myGlobalClass" 132 is set forth in the first line as well as the interface that it implements which has been named "myGlobalInterface"134. The property of String str 136 is identified as well as the variable static Integer count 138 is identified. In addition to the properties of static integer count 138 and String str 136 in which both are global. The class also has a signature 140 of "myGlobalClass"(String str).

The class also has several methods: the String getStr method 142 which, in this case, has been deprecated by a deprecated line; a void incrementCount method 145; an Integer getCount method 146; and a void interfaceMethod 148. All of these methods and properties are similar to those of other object oriented programming languages and similar functions can be performed. Further information regarding exactly how the class is executed and the functions it performs can be obtained from a study of the force.com platform.

FIG. 2A shows a presentation display of the class summary 128 of the presentation display of FIG. 1A. In the class summary, a version pick list is presented 150 which allows the user to select which version of a particular class to view a summary for. In this particular example, the user has selected to view version 1.0. The name of the class 152 is provided on the display as "myGlobalClass" and the nature of the class 154 is also provided on the display as a global class. The display also provides 156 below the name of the class, the versions of the class which are available. By selecting the arrow to reveal the version pick list 150, a list of all of the available versions can be viewed.

The summary display provides a table which includes information for interfaces 158, properties 160, constructors 162, and methods 164. For each item, the name or signature 166 is provided in a column and the version availability 168 is provided in another column. In the illustrated example, three columns are provided which identify the nature of the summarized attribute and then provide, in the second and third columns, the name and version availability. In some cases an attribute may be in all versions. Additional columns may be added or the name or version availability columns may be removed, depending on the particular implementation.

As shown in FIG. 2A, for the interfaces there is a first interface providing global access having the name "myGlobalInterface this interface is available in all of the version. In other words, the interface has not been changed in any of the versions. It is shown in FIG. 2A to indicate that it is a part of version 1.0. The properties column indicates a global property with the name of string str. This property is also available in all of the versions. Similarly, there is a constructor with global access with a signature of "myGlobalClass String str) also available in all versions. Finally, under methods there are three global methods listed, String getStr( ), void interfaceMethod, and void setStr (String str).

Figure 2B:
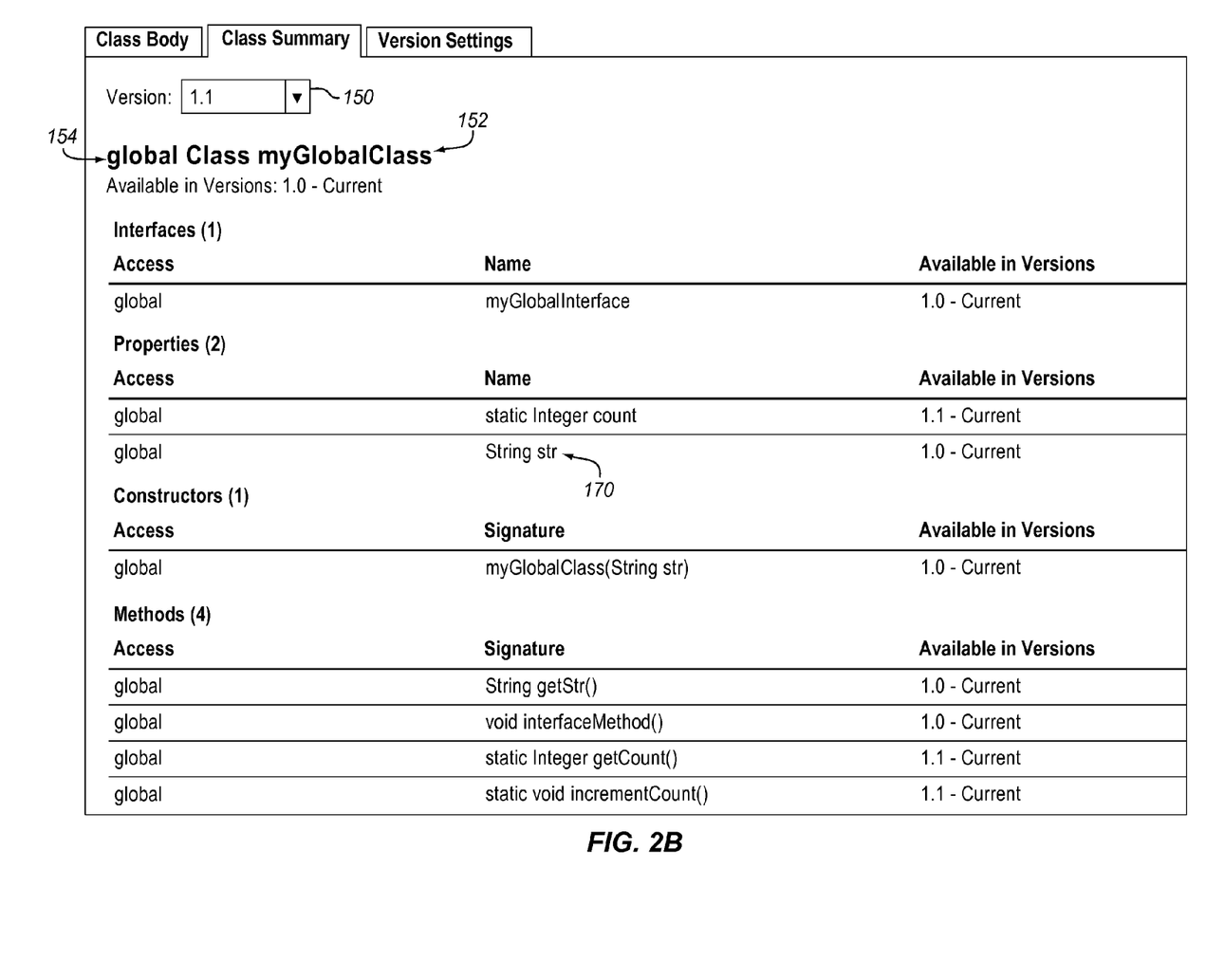

Referring to FIG. 2B, a similar presentation for version 1.1 is shown. Again the pick list 150 shows the version number. In addition, the classification for the class 154 is provided as well as the name of the class 152. In the presentation of FIG. 2B, the same features are shown to the extent that they are the same as those of version 1.0. As can be seen, in version 1.1 the presentation display shows that an additional property had been added with version 1.1, a static integer count. Two additional methods have also been added, a static integer getCount and a static void incrementCount. In addition, the void setStr method has been deprecated.

The displays of FIGS. 2A and 2B allow the two versions to be analyzed and compared in detail without referring to the source of FIGS. 1A and 1B. The features are easier to identify using the columns. If the developer is already familiar with the properties, constructors, and methods and how they are used in the particular class, then there may be no need to refer to the source at all. On the other hand, the source can easily and immediately be viewed by selecting the class body tab. Using the pick list, each version can be studied individually or all of the versions can be compared in the class summary as shown in FIG. 3.

Figure 3:
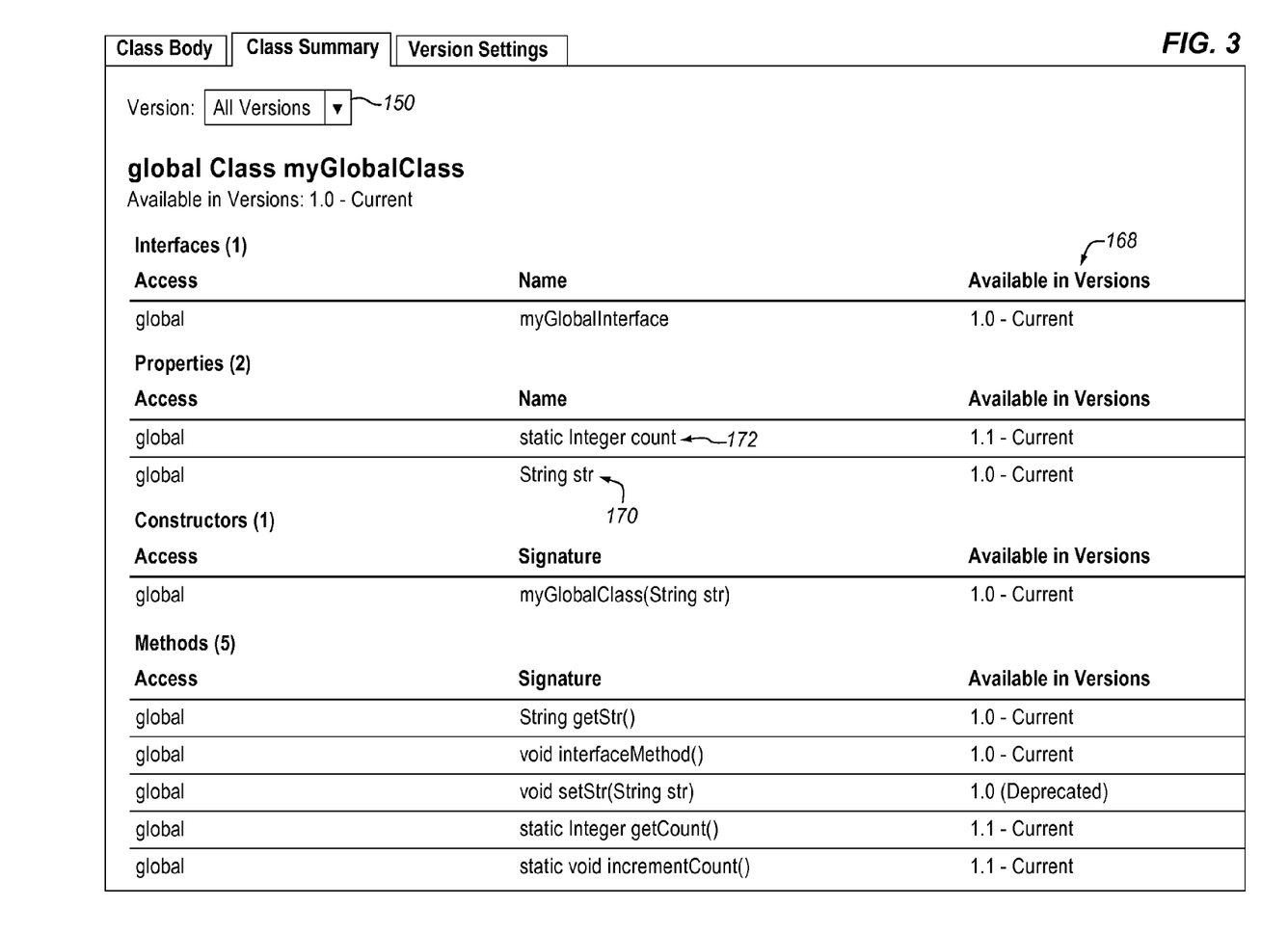
FIG. 3 illustrates a representative simultaneous presentation of all prototype versions of a class showing class summaries in an embodiment.

FIG. 3 shows a similar presentation display which includes all of the versions in this class summary. All of the interfaces, properties, constructors, and methods are shown for all of the versions. In the versions column 168, each of the features of the class is annotated with which versions the feature occurs in. So, for example, while the property string str 170 is shown as present in versions 1.0 through to the current version, the property static integer count 172 is indicated in the versions column 168 as being present only in versions 1.1 to the current. The all versions presentation display allows all of the versions to be quickly compared on a single page.

Processes

Figure 4:
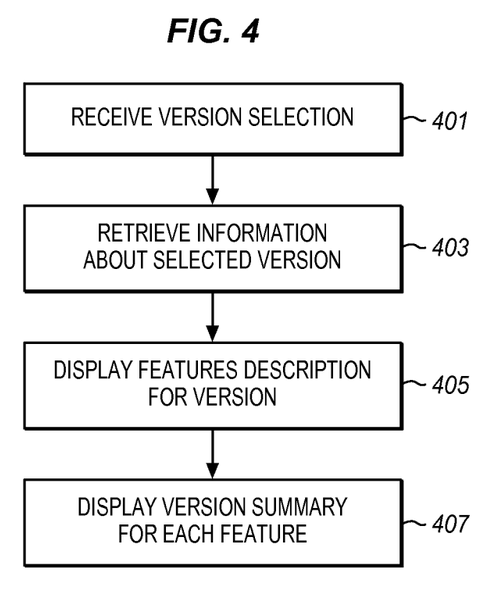
FIG. 4 is an operational flow diagram illustrating a high level overview of a technique for presenting different versions of application code in an embodiment.

Referring to FIG. 4, an operational flow diagram is shown illustrating a high level overview of a technique for presenting different versions of application code. Before these operations, a user will typically log on to the system, provide credentials and identification, and select a particular class. The system can then determine whether the class is available and whether the user has access to the class. These operations are not shown. Beginning at the top of FIG. 4, after a class has been identified, at block 401, a version selection is received by the presentation system. At block 403, information is retrieved about the version that has been selected. At block 405 descriptions are displayed for each of the features in the version. The features might include, as shown for example in FIG. 2A, interfaces, properties, constructors, and methods, among others. The description may include names, variables, and signatures, among others. The description may also include a body for the class and version settings. At block 407, a version summary is provided for each listed feature to indicate the versions of the application code that contain that feature. This version summary as presented for example in FIG. 2A and can be presented simultaneously with a description of the features.

Figure 5:
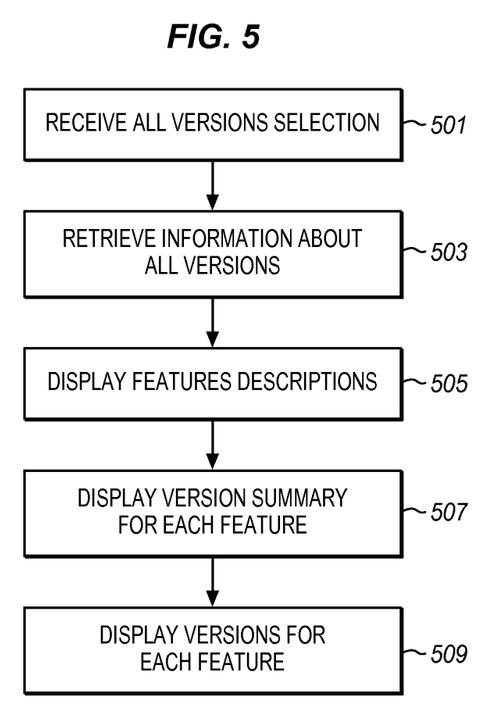
FIG. 5 is an operational flow diagram illustrating a high level overview of a technique for presenting different versions of application code in another embodiment.

FIG. 5 is an operational flow diagram of a technique for presenting different versions in another embodiment of the application code. In block 501, a selection for all of the versions is received. Such a selection can be used to generate a display such as that of FIG. 3. At block 503, information is retrieved about all of the versions. At block 505, a description of all of the features of all of the versions is displayed. At block 507, version summaries are displayed for each feature. As described in the context of FIG. 3, this summary can indicate which versions contain each of the displayed features. This can be presented as an additional column in the class summary display as shown for example in FIG. 3. It may also be presented in other ways. At block 509, versions are displayed for each of the displayed features. This shows the users which of the available versions include the corresponding feature.

The above description is presented as first receiving or making a version selection and then retrieving or presenting information about the selected version. Alternatively, information about all versions could be retrieved as the first step. The system would then display information about all of the versions. After viewing this presentation, then, upon receiving a version selection, the data could be filtered to display only data relevant to the selected version. The particular ordering of the operations is not essential to the invention and a session can be started or finished in a variety of different ways. The described presentation system may be adapted to suit the needs, tastes, workflow patterns, and preferences of many different users and developers.

System Overview

Figure 6:
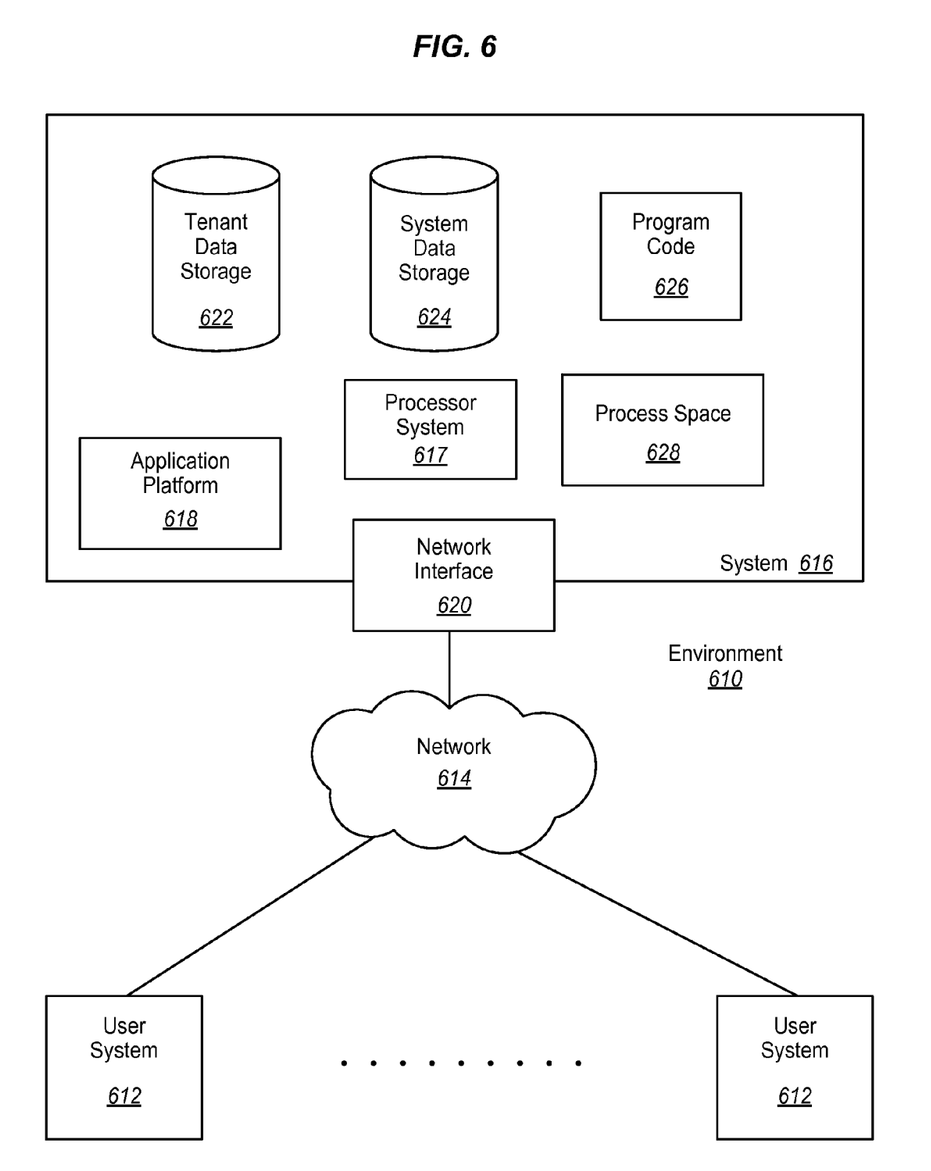
FIG. 6 illustrates a block diagram of an example of an environment wherein an on-demand database service might be used.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 16 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
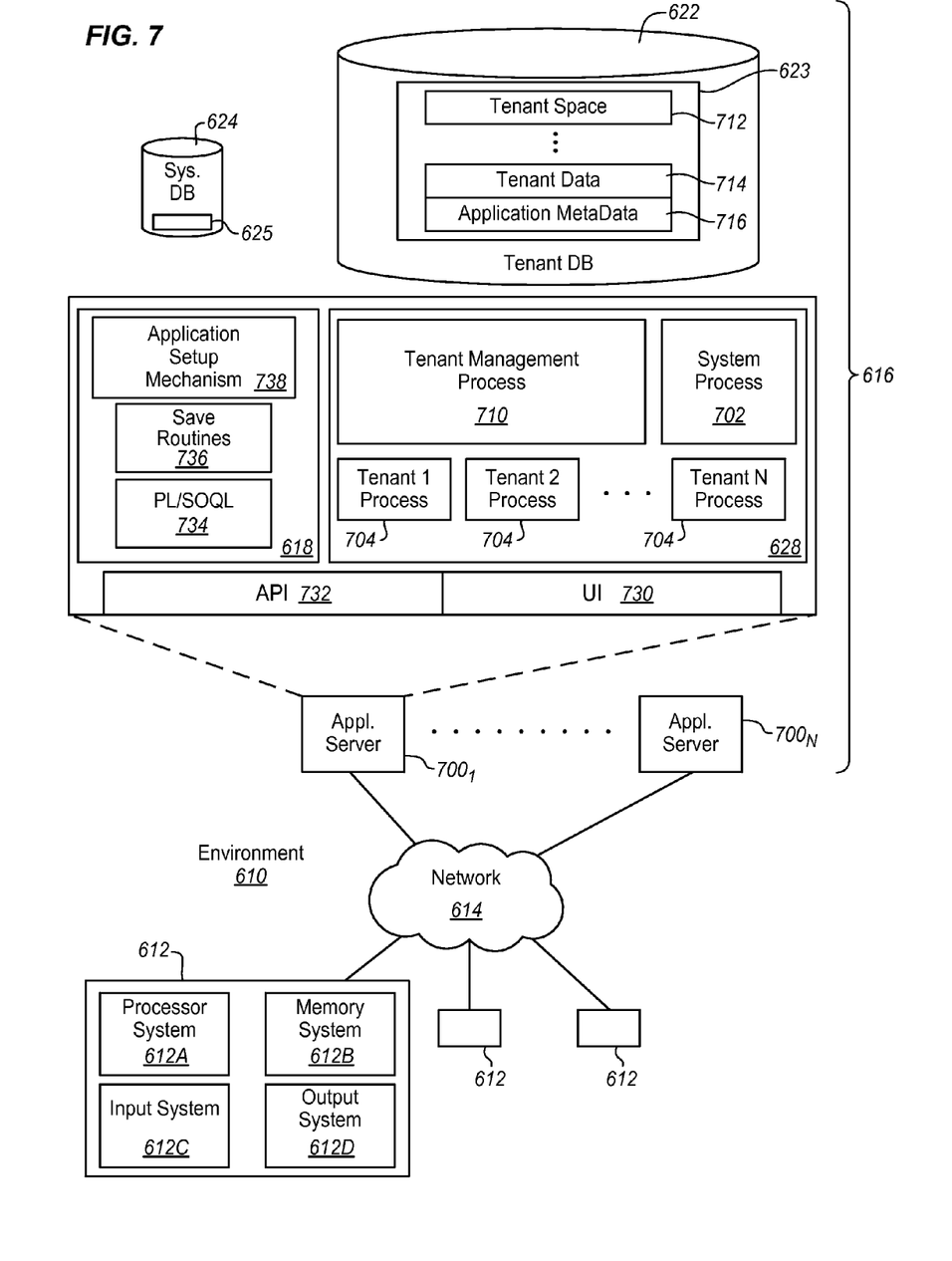
FIG. 7 illustrates a block diagram of an embodiment of elements of FIG. 6 and various possible interconnections between these elements.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 7001-700N, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 7001 might be coupled via the network 614 (e.g., the Internet), another application server 700N-1 might be coupled via a direct network link, and another application server 700N might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multitenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by, creating custom fields for standard objects, including custom index fields. U.S. patent application Ser. No. 10/817,161, filed Apr. 2, 2004, entitled "Custom Entities and Fields in a Multi-Tenant Database System", issued on Aug. 17, 2010 as U.S. Pat. No. 7,779,039 and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
   receiving a selection of a version of a class, the class being one of a plurality of components of an object-oriented application , the application being configured to run on an application server of an on-demand database service, the class having source code and a plurality of features including properties, constructors, and methods;
   retrieving general information about the selected version of the class and presenting the general information in an identification panel of a display;
   displaying features, including properties, constructors, and methods, contained within the selected version of the class in a class summary window of the identification panel of the display;
   displaying, together with the features and also in the class summary window, version availability for a feature to indicate the different versions of the class that contain the respective feature;
   receiving a selection of one of the different versions of the class that contains the respective feature; and
   displaying features, including properties, constructors, and methods contained within the selected different version of the class in the class summary window instead of the features of the originally displayed version of the class.

2. The method of claim 1, further comprising displaying version numbers for a plurality of different versions of the class for selection by the user and upon receiving a selection of a version number displaying a features for the version corresponding to the selected version number in response thereto.

3. The method of claim 1, further comprising receiving an all versions selection for the class and displaying features contained within any of the versions of the class in the class summary window instead of the features of the originally displayed version of the class in response thereto.

4. The method of claim 3, further comprising displaying in the class summary window an indication of versions of the class which include each described feature.

5. The method of claim 1, further comprising receiving a source selection and displaying source code for the selected version in a class body window of the identification panel in response thereto.

6. The method of claim 5, further comprising receiving an edit command for the selected version and providing a code editor in the class body window for the selected version in response thereto.

7. The method of claim 1, wherein the features include attributes, variables, and access levels of the selected version.

8. The method of claim 1, wherein the features include names of functions and variables for the features.

9. A non-transitory machine-readable medium carrying one or more sequences of instructions, which instructions, when executed by one or more processors, cause the one or more processors to perform:
   receiving a selection of a version of a class, the class being one of a plurality of components of an object-oriented application , the application being configured to run on an application server of an on-demand database service, the class having source code and a plurality of features including properties, constructors, and methods;
   retrieving general information about the selected version of the class and presenting the general information in an identification panel of a display;
   displaying features, including properties, constructors, and methods, contained within the selected version of the class in a class summary window of the identification panel of the display;
   displaying, together with the features and also in the class summary window, version availability for a feature to indicate the different versions of the class that contain the respective feature;
   receiving a selection of one of the different versions of the class that contains the respective feature; and
   displaying features, including properties, constructors, and methods contained within the selected different version of the class in the class summary window instead of the features of the originally displayed version of the class.

10. The medium of claim 9, wherein the features include attributes, variables, and access levels of the selected version.

11. The medium of claim 10, wherein the descriptions include names of functions and variables for the features.

12. An apparatus comprising:
a processor; and
one or more stored sequences of instructions which, when executed by the processor, cause the processor to carry out the steps of:
receiving a selection of a version of a class, the class being one of a plurality of components of an object-oriented application, the application being configured to run on an application server of an on-demand database service, the class having source code and a plurality of features including properties, constructors, and methods;
retrieving general information about the selected version of the class and presenting the general information in an identification panel of a display;
displaying features, including properties, constructors, and methods, contained within the selected version of the class in a class summary window of the identification panel of the display;
displaying, together with the features and also in the class summary window, version availability for a feature to indicate the different versions of the class that contain the respective feature;
receiving a selection of one of the different versions of the class that contains the respective feature; and
displaying features, including properties, constructors, and methods contained within the selected different version of the class in the class summary window instead of the features of the originally displayed version of the class.

13. The apparatus of claim 12, wherein the description of features includes an indication of versions of the class which include each described feature.

14. The apparatus of claim 13, further comprising receiving a source selection and displaying source code for the selected version in a class body window of the identification panel in response thereto.

15. A processor system in an application development environment of a code development system to generate a presentation, the processor system comprising:
a class selection interface to receive a selection of a class and to retrieve general information about the class from system data storage the code development system, the class being one of a plurality of components of an object-oriented application, the application being configured to run on an application server of an on-demand database service, the class having source code and a plurality of features including properties, constructors, and methods;
a list of features contained within a selected version of the class presented in a class summary window of an identification panel of the presentation;
characteristics of each listed feature, including properties, constructors, and methods of the class also displayed in the class summary window of the presentation;
a version availability for each listed feature to indicate the different versions of the class that contain the respective feature also displayed in the class summary window of the presentation;
a version selection interface to receive a selection of one of the different versions of the class that contains the respective feature; and
a list of features, including properties, constructors, and methods contained within the selected different version of the class in the class summary window instead of the features of the originally displayed version of the class.

16. The system of claim 15, wherein the version selection interface allows the selection of one of a plurality of different versions of the class.

17. The system of claim 15, wherein the version selection interface lists version numbers for a plurality of versions.

18. The system of claim 15, wherein the version selection interface includes a selection for multiple versions of the plurality of versions so that multiple versions are presented simultaneously.

19. The system of claim 15, wherein multiple versions are presented simultaneously, and wherein the version availability indicates versions of the class for each feature of each presented version.

20. The system of claim 15, further comprising a code view interface to allow the source code of the selected version of the class to be displayed in a class body window of the presentation.

* * * * *